Oct. 27, 1970   J. D. McMILLEN ET AL   3,536,971
INHERENT CURRENT LIMIT CIRCUIT
Filed Oct. 20, 1966   2 Sheets-Sheet 1

INVENTORS
John D. McMillen
Merle J. Zacharias
Jack D. Daugherty
BY
ATTORNEYS

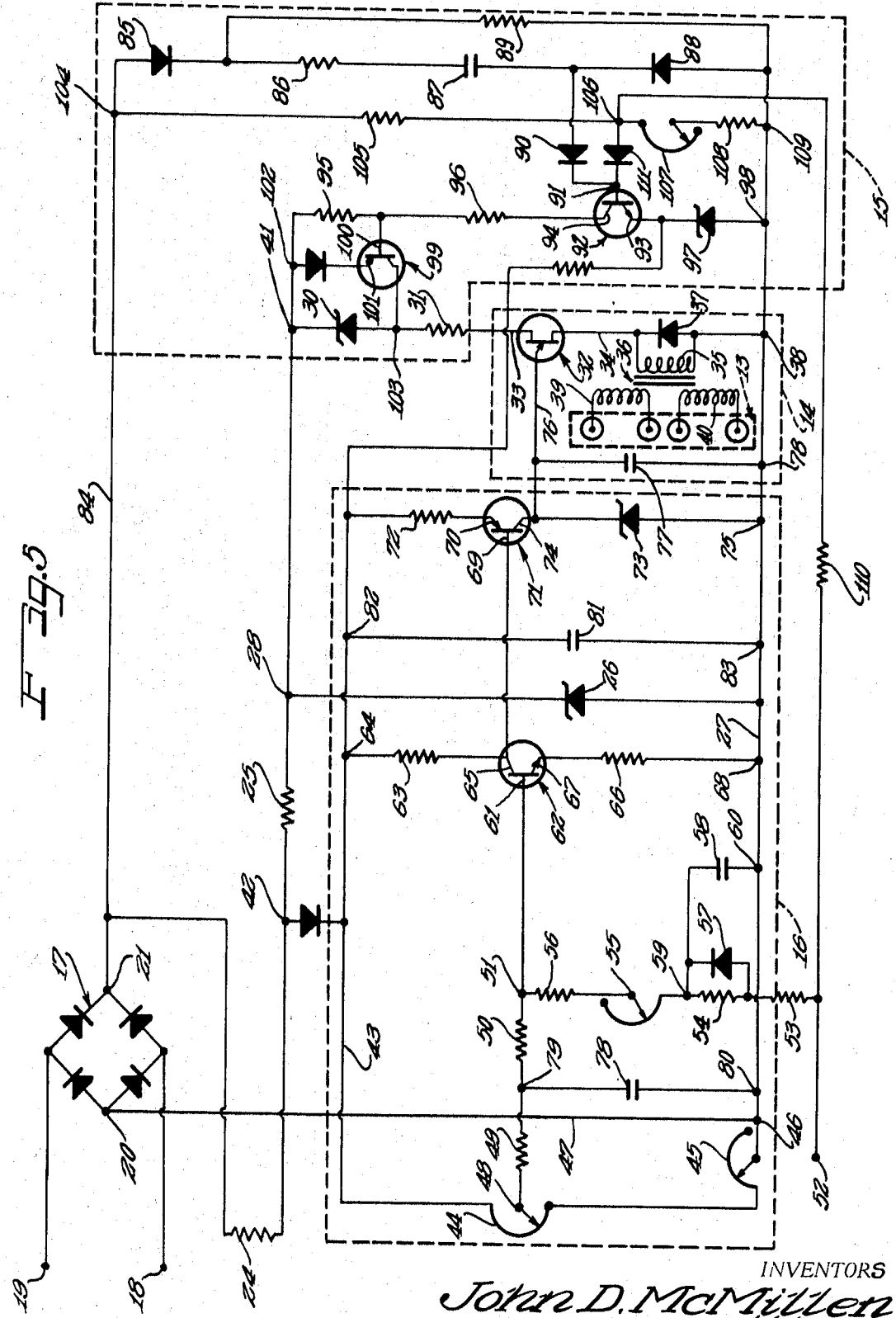

United States Patent Office 3,536,971
Patented Oct. 27, 1970

3,536,971
INHERENT CURRENT LIMIT CIRCUIT
John D. McMillen, West Lafayette, and Merle J. Zacharias, Lafayette, Ind., and Jack Donald Daugherty, Winchester, Mass., assignors to Gerbing Manufacturing Company, Elgin, Ill., a corporation of Illinois
Filed Oct. 20, 1966, Ser. No. 588,092
Int. Cl. H02p 5/06
U.S. Cl. 318—331                               11 Claims

ABSTRACT OF THE DISCLOSURE

A control system for supplying energy to a motor which includes an SCR as a first switching means for connecting a power supply to the motor and a unijunction transistor for controlling the firing time of the SCR. The operation of the unijunction transistor is inhibited during the first 90° of conduction of the power input signal. The back EMF of the armature is used as a speed sensing signal, and the operation of the unijunction transistor is also inhibited when the back EMF exceeds a preset level.

---

This invention relates to a control system for supplying energy to a load and more particularly relates to a system for gating a portion of a periodic pulse to a load and for controlling the gating interval and thereby the average power delivered to the load.

The need for variable speed mechanical shaft power exists in many industrial situations. One method of achieving this variable speed is to control the average value of current supplied to the armature of a DC motor whose shunt field receives a constant excitation. By means of suitable feedback signals introduced to a control circuit, it is possible to cause a motor's speed to be nearly constant at any arbitrarily established level as the shaft torque varies from zero to full load.

In the past, both magnetic amplifiers and thyratrons, along with suitable control circuitry, have been employed as means of controlling the armature current. Within a few years since the advent of the silicon controlled rectifier, it has become economically feasible to utilize SCR's as a means of gating power to the armature. Properly designed, the result is a compact, lightweight motor control with excellent reliability and reasonable cost.

As noted above, in the usual method, when an SCR is gated by a control signal, it then allows current from an AC power line to flow into the armature. When this current drops below a certain small value, the SCR stops conducting, and it must receive another gate signal at an appropriate time to start conduction again. The result is armature current which is a controlled train of pulses of the same polarity. The motor's torque is then proportional to the average value of armature current.

The feedback signal which is used to develop a shaft speed which is independent of load is ideally a voltage which is directly proportional to the shaft speed. Since the back-generated voltage in a DC shunt motor is proportional to motor shaft speed and since the IR drop in the armature is comparatively small at operating speeds, the armature voltage provides a signal which can effectively be used as a speed control feedback signal. The feedback sensitive signal is then compared with a reference signal as might be generated by a potentiometer or the like, and the difference between the feedback and reference signals is a useful criteria for regulating the power delivered to the motor. Also, by varying the reference voltage, a selectable speed may be obtained, as the power delivered to the motor will continue to increase until the speed sensitive feedback signal obtains a specified level relative to the reference signal.

Assuming, for instance, that a DC motor operating at a constant speed should suddenly become jammed or otherwise heavily loaded, the instantaneous power delivered to the motor would not change, but due to the sudden increase in torque on the rotating shaft, the motor would be reduced to a substantially slower speed or to a full stop. The result would be that the speed sensitive feedback signal would be reduced to a low level which in turn would increase the difference or error signal which is utilized to increase the power to the load. It is apparent then that sudden jamming of a motor or the like would result in the introduction of large in-rush currents which would well destroy the SCR control assembly or the motor itself. It has been recognized, therefore, that means must be provided to limit the in-rush currents to the motor and to override the demands of the feedback system for excessive increases in armature current.

Accordingly, it is a principal object of this invention to provide a novel electrical control system for supplying energy to a load.

It is another object of this invention to provide a control system for limiting the current in-rush to a load.

It is also an object of this invention to provide a speed control device for regulating the speed of a DC motor and for limiting the excitation of the armature in response to sudden increases in demand for motor speed.

It is another object of this invention to provide a circuit for energizing a DC motor with a series of unidirectional pulses and for controlling the average power to the motor by varying the firing angle of the pulse signals and wherein a limiting circuit is provided for preventing increases in the firing angle beyond a predetermined firing angle.

It is also an object of this invention to provide a means for exciting the armature of a DC motor with a unidirectional pulse train and for varying the firing angle of the unidirectional pulses in response to changes in motor speed and for preventing the increasing of the firing angle beyond a specified limit in accordance with motor speed.

It is an additional object of this invention to provide an inhibit circuit for decreasing the permissible instantaneous excitation of a DC motor in response to increasing demands for motor excitation.

It is a further object of this invention to provide a control system for gating unidirectional pulses to the armature of a DC motor and for automatically increasing the gating or firing angle of the unidirectional pulses in response to decreases in motor speed below the selected speed and wherein an inhibit circuit is provided for decreasing the permissible firing angle of the unidirectional pulses in response to demands for increasing the motor speed.

It is a more specific object of this invention to provide an inhibit circuit for preventing the firing of a unijunction gating circuit at times when the power input signal exceeds the armature speed sensitive signal by a specified magnitude.

It is also an object of this invention to provide an inhibit circuit for preventing the firing of a gating circuit during the rise time of a unijunction pulse signal applied across the gating circuit and for preventing the firing of the gating circuit during only a portion of the fall time of the unidirectional pulse signal.

It is another object of this invention to provide an inhibit circuit for a variable speed control device which generates an inhibit signal for preventing the firing of a unijunction gating circuit approximately during the first 90° of the gated signal and which generates a second inhibit signal for preventing the firing of the unijunction gating circuit at time intervals when the gated signal exceeds the armature feedback signal.

These and other objects, features and advantages of the present invention will be understood in greater detail from the following description and the associated drawings wherein reference numerals are utilized in designating an illustrative embodiment and wherein.

Figure 1:
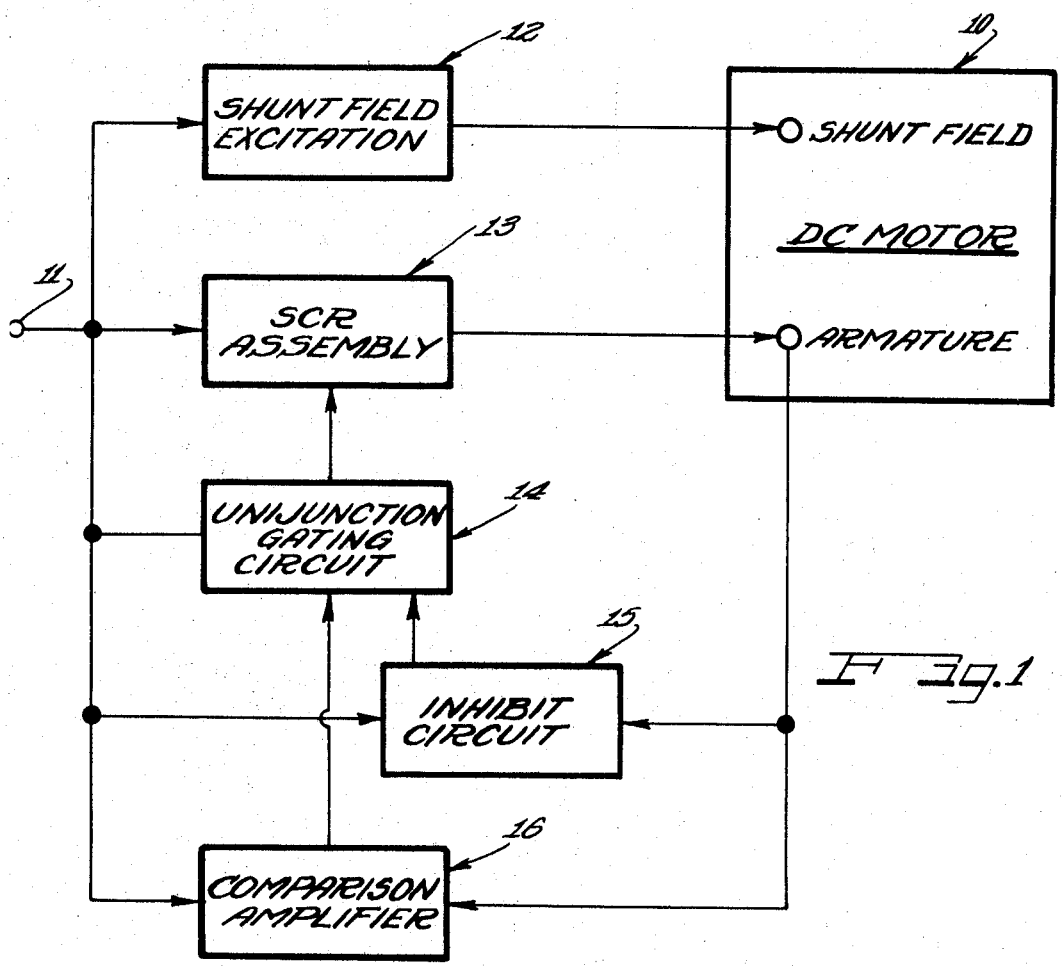
FIG. 1 is a block diagram showing the operation of the control circuit of this invention.
Figure 4:
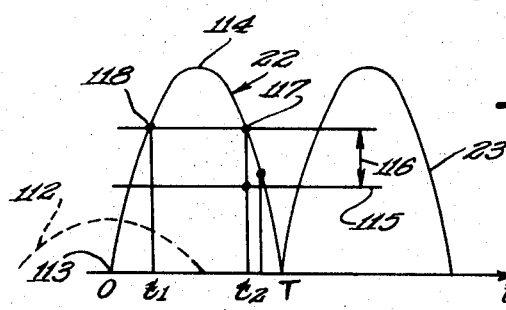

FIG. 4 is a diagrammatic view of a rectified pulse train utilized to energize the DC motor of FIG. 1 and illustrating the manner in which the inhibiting signals are employed to control the gating time of the SCR assembly, and FIG. 5 is a schematic of a portion of the speed control as illustrated in FIG. 1 and in particular is an illustration of the unijunction gating circuit and inhibiting circuit of this invention.

The illustrative embodiment of this invention shown in the drawings comprises generally a variable speed control circuit for a DC motor which incorporates the current limiting means for regulating current in-rush to the armature of the motor. The input to this circuit is a full wave rectified AC signal with each pulse of the signal being gated to the armature for a specified time interval. By varying the gating time interval of each pulse in the unidirectional pulse train, the average power delivered to the armature can be adjusted and hence the speed can be controlled for a given amount of torque.

In addition to controlling the speed by adjusting the gating interval of the input pulse train, feedback means can be provided to automatically maintain a pre-set speed regardless of variations in torque at the motor shaft. Essentially, the feedback signal is provided to be substantially proportional to the speed of the motor shaft. This feedback signal is then compared to a reference input signal, and the difference or error signal is then used as the criteria for controlling the gating interval for the pulse train being fed to the motor armature. If the different signal is large, that is if the discrepancy between the actual motor speed and the requested speed is large, the gating time interval will be increased for increasing the average power delivered to the armature and hence for increasing the speed of the motor shaft.

However, should the motor shaft experience a sudden increase in torque, the speed of the shaft would decrease sharply, and the difference signal would suddenly increase, thereby demanding a large surge of power to the armature. This large undesirable surge of current is a consequence of the circuit suddenly increasing the firing time interval of the input pulse train beyond a desirable level.

Accordingly, the illustrative embodiment of this invention provides a means for controlling the increase in the firing time interval of the input pulse train. Generally, this is accomplished by providing an inhibit signal which overrides the automatic triggering or gating mechanism under specified conditions. In the embodiment of FIG. 5 those conditions are, first, the inhibiting signal is generated substantially during the rise time of each unidirectional pulse, and, second, the inhibiting signal is generated during the fall time of the unidirectional pulse in a manner which is responsive to changing motor speed and which thereby accomplishes a gradual, rather than a sudden increase, in armature current and speed.

Referring to the drawings in more detail, a DC motor 10 as shown in FIG. 1 is energized by a variable speed control circuit according to this invention. A standard AC supply line is connected to the speed control circuit at a junction point 11 and provides the power source for the shunt field excitation 12, the SCR assembly 13, the unijunction gating circuit 14, the inhibit circuit 15, and the comparison amplifier 16.

The shunt field of the DC motor 10 is continuously energized through the shunt field excitation circuit 12, while the armature of the DC motor 10 is energized only intermittently through the SCR assembly 13. The firing time of the SCR assembly relative to each unidirectional pulse will determine the average power delivered to the armature and hence the speed of the motor 10 with other factors, such as torque, held constant. Accordingly, if the speed of the motor is required to be increased, means must be provided for firing the SCR assembly earlier in each input cycle.

The firing time of the SCR assembly 13 is controlled by the unijunction gating circuit 14, and by increasing the firing response of the unijunction gating circuit 14, the SCR assembly can be fired at an earlier time in each input cycle. However, the speed of response of the unijunction gating circuit 14 is controlled by the voltage output from the comparison amplifier 16. If the comparison amplifier 16 has a large output voltage, the speed of response of the gating circuit 14 will be increased, and the SCR assembly will be fired at an earlier cycle time.

The output of the comparison amplifier 16 is the difference or error signal which results from comparing a feedback signal from the motor armature with a reference signal. Should the motor speed decrease, the feedback signal from the armature would correspondingly decrease and the difference signal would increase, resulting in a rapid response of the unijunction gating circuit 14 and an earlier firing time for the SCR assembly. A decrease in the firing time of the SCR assembly means increased power for the motor armature. Accordingly, the speed of the motor will then be increased until a point is reached where the speed requirements of the comparison amplifier and SCR are satisfied.

When, however, the decrease in speed of the armature of the motor 10 generates an excessive increase in the firing time interval of the unijunction gating circuit 14, the inhibit circuit 15 generates a signal for overriding the comparison amplifier. While the comparison amplifier calls for a continuous increase in the firing time interval of the unijunction gating circuit, the inhibit circuit prevents increases in the firing time interval beyond a predetermined duration. In this way, the in-rush of current to the armature is controlled, and the comparison amplifier is effective only within the limits specified by the inhibit circuit 15.

Referring to the circuit in greater detail, a full wave rectifier 17 is shown in FIG. 5 as supplying the input signal to the comparison amplifier 16, the gating circuit 14 and the inhibit circuit 15.

A standard AC signal is connected across the input terminals 18 and 19 of the full wave rectifier 17, and the output is fed to the various circuit components through terminals 20 and 21. The output signal at the terminals 20 and 21 comprises a full wave rectified or unidirectional pulse signal as shown in FIG. 4 at 22 and 23.

Figure 2:
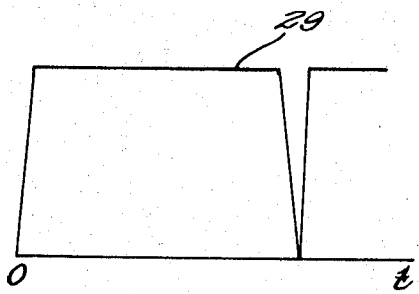
FIG. 2 is a diagrammatic representation of a timing voltage utilized in the circuit diagram of FIG. 1 for keying the firing of the unijunction gating circuit to the phase of the supply voltage applied to the SCR assembly.

The output of the rectifier 17 is fed through first and second resistors 24 and 25 and a Zener diode 26 to a circuit common line 27. The Zener diode 26 has the effect of clipping the peaks of the sinusoidal rectified signal at the breakdown voltage of the diode which for instance may be 33 volts. The result is that the voltage appearing at the junction point 28 may be approximated by the voltage waveform 29 shown in FIG. 2. This voltage may be referred to as a timing voltage and is used to key the firing of the unijunction gating circuit to the energization of the SCR assembly.

The timing signal illustrated by the voltage waveform 29 is applied from the junction point 28 through a Zener diode 30 and a resistor 31 to a unijunction transistor 32. The unijunction transistor 32 has a first base 33 connected to the resistor 31 and a second base 34 connected through a parallel combination of a primary winding 35 of a transformer 36 and a diode 37. The transformer-diode combination is connected to the circuit common line 27 at the junction point 38.

The transformer 36 has two secondary windings 39 and 40, each of which may be connected in series with the gate of an SCR associated with the SCR assembly 13. Accordingly, when the unijunction transistor 32 fires, the timing voltage 29 as applied to the junction point 41 will generate a current through the transformer 36 for firing the SCR and energizing the motor armature. It will be noted that two conditions must be satisfied to accomplish the firing of the SCR assembly 13. First, the timing voltage 29 must be present at the junction point 41, and second, the unijunction transistor 32 must be triggered. Since the timing voltage 29 is in phase or keyed to the voltage signal applied across the SCR assembly controlling the firing time of the unijunction transistor 32 will result in a similar control of the gating time of the SCR assembly. That is, the firing time of the unijunction transistor relative to the timing voltage 29 is keyed to the firing of the SCR assembly relative to the armature supply voltage.

The firing time of the unijunction transistor 32 is affected by several elements. For example, the timing voltage 29 is applied from a junction point 42 through a line 43 to an external speed adjustment control 44. A second speed adjustment control 45 is connected between the control 44 and the circuit common line 27. The circuit common is returned from a junction point 46 through a line 47 to the terminal 20 of the rectifier 17.

By adjusting the potentiometers 44 and 45, the voltage level applied to the circuit point 46 is regulated. This voltage is then fed through resistors 49 and 50 to a circuit junction point 51 where it is mixed with the armature or speed sensitive feedback signal. The feedback signal is connected to the circuit at the point 52 and is introduced through first and second resistors 53 and 54 and a potentiometer and resistor 55 and 56, respectively, to the junction point 51. A diode 57 is connected in parallel with the resistor 54, and a capacitor 58 is connected from the point 59 to the common line 27 at a point 60. The resistor 54, diode 57, and capacitor 58 together provide a speed regulation circuit which is the subject of my copending patent application entitled "Speed Regulator."

The feedback signal and the reference signal as established by the potentiometers or speed adjustment controls 44 and 45 are subtracted at the junction point 51, and the difference or error signal is applied to the base 61 of the first amplifier transistor 62. A relatively high resistance 63 is connected from a junction point 64 to the collector 65 of the transistor 62. A much smaller resistance 66 is connected from the emitter 67 to the common line 27 at the junction point 68. The resistance 66 may be in the order of 30K ohms, for instance, while the resistance 66 may be in the order of 300 ohms resulting in a voltage gain of approximately 100.

The voltage gain established across the resistance 63 is applied across the base 69 and the emitter 70 of a second transistor 71. An emitter resistance 72 is connected from the line 43 to the emitter 70, and a Zener diode 73 is connected from the collector 74 to the common line 27 at a junction point 75.

The output of the second transistor 71 provides the voltage for controlling the operation of the unijunction gating circuit 14. In particular, the collector 74 of the transistor 71 is connected directly to the emitter 76 of the unijunction transistor 32, and a capacitor 77 is connected in parallel with the Zener diode 73 from the collector 74 to the common line 27 at circuit junction 75. Accordingly, the voltage developed at the collector 74 of the transistor 71 will cause the capacitor 77 to charge until such a voltage is reached across the capacitor 77 which is adequate for firing the unijunction transistor 32.

When the unijunction transistor fires, the capacitor 77 will then discharge as is well understood for producing a signal across the transformer 36 to gate the SCR assembly 13. The charging time of the capacitor 77 will depend upon the magnitude of the voltage available at the collector 74 of the transistor 71. If the voltage at the collector 74 reaches a relatively high magnitude, the capacitor 77 will charge rapidly and reach the firing potential of the unijunction transistor 32 more quickly than if a substantially lower voltage were available at the collector 74. Since the capacitor 77 will begin charging at the beginning of each pulse of the input signal, the speed at which the capacitor 77 reaches a firing potential will determine the firing angle of the SCR assembly 13. Accordingly, when the difference voltage developed at the junction point 51 is of a relatively large magnitude, the capacitor 77 will be charged quickly to the firing potential of the unijunction transistor 32 for gating the SCR assembly 13 at an early firing angle thereby increasing the average power to the motor armature and increasing the speed thereof to the desired setting of the speed adjustment control 44. It will be noted that changes in the firing angle of the SCR assembly 13 may be brought about by an adjustment of the speed control 44 or by an increase in torque and an associated decrease in motor speed as reflected in the feedback signal applied to the circuit point 52. Sudden changes in the control setting of the speed adjustment control 44 would tend to generate substantial increases in voltage at the junction point 51. Accordingly, a capacitor 78 is connected between the junction point 79 and the common line 27 at the junction point 28. Effectively, the capacitor 78 smooths out sudden changes in voltage which would otherwise be experienced at the junction point 79 and consequently at the junction point 51. A second capacitor 81 is connected from the line 43 at a circuit junction point 82 to the common line 27 at a second junction point 83. The capacitor 81 effectively removes the substantial ripple of the timing voltage signal which is applied across the amplifier transistor 62 and 71. Accordingly, the timing voltage can be utilized as a supply voltage for the amplifiers.

The inhibit circuit 15 is used to prevent the unijunction transistor 32 from firing prior to a specified time in each unidirectional pulse. This is accomplished by raising the interbase voltage of the transistor 32 to a level above the firing capacity of that transistor during the time when firing would be undesirable.

The inhibiting of the firing of the unijunction transistor 32 is accomplished in two steps. First, the output signal of the rectifier 17 is fed from the junction point 21 through a line 84 and a diode 85 to a phase shifting circuit consisting of a resistor 86 at a capacitor 87, a diode 88 and a further parallel resistor 89. The output of the rectifier 17 is fed through the diode 85 and is phase shifted through the resistor 86 and the capacitor 87. Accordingly, the current through the capacitor 87 is fed through a second diode 90 to a base 91 of a transistor 92. This current will be lagging by approximately 90° in comparison to a voltage applied across the emitter 93 and collector 94 of the transistor 92. Due to this out-of-phase relationship, the transistor 92 will be maintained in a conducting state approximately during the first 90° or during the rise time of each signal pulse. It will be noted that since the capacitor 87 is in the path of a unidirectional current, means must be provided to discharge the capacitor, and, therefore, the resistor and diode 89 and 88, respectively, are connected in a well understood manner to prevent the build-up of charge on the capacitor 87. Also, the diode 85 serves the purpose of isolating the capacitor discharge from the input of the network.

When the transistor 92 is held in a conducting state due to the phase shifted signal as applied to the base 91 of that transistor, a current will exist from the circuit junction point 41 through resistors 95 and 96, through the transistor 92 and the Zener diode 97 which is connected from the emitter 93 to the common line 27 at the junction point 98. This current which is established within the resistor 95 biases a second transistor 99 into an "on" condition by establishing the proper voltage between the base and emitter connections 100 and 101. When the transistor 99 is placed in a conducting state, a current path is completed from the circuit junction point 102 through the transistor 99 to the circuit junction point 103, thereby bypassing the Zener diode 30 and connecting the input signal directly to the point 103.

Figure 3:
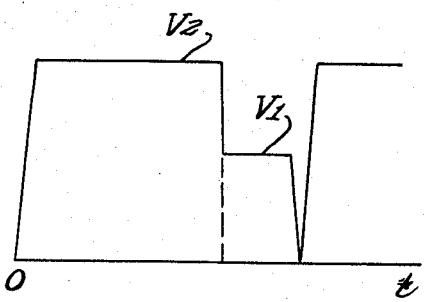
FIG. 3 is a voltage diagram similar to the diagram of FIG. 2 for showing the timing voltage at both the inhibited and uninhibited voltage levels.

Assuming, for instance, that the Zener diode 30 is rated at 18 volts and that the Zener diode 26 is rated at 33 volts, prior to the conduction of the transistor 99, the voltage at the junction point 103 would be 33 minus 18, or 15 volts, as shown at $V_1$ in FIG. 3. However, when the transistor 99 conducts, a substantially short circuit is provided across the Zener diode 30, and the voltage at the junction point 103 increases suddenly from 16 to 33 volts, as shown at $V_2$ in FIG. 3. This, in turn, causes an increase in the interbase voltage of the unijunction transistor 32. Since the voltage which is developed on the capacitor 77 is limited by the parallel connection of the Zener diode 73, the various parameters can be arranged such that the increase in interbase voltage experienced by the sudden conduction of the transistor 99 can be used to prevent the firing of the unijunction transistor 32 when the capacitor 77 reaches its maximum charge as determined by the Zener diode 73. For instance, if the Zener diode 73 is rated at 18 volts, then the maximum interbase voltage which may be fired by the capacitor 77 can be arranged to be substantially less than 33 volts and more than 15 volts. This means that by placing the transistor 99 in a conducting state, the unijunction transistor 32 can be inhibited from firing regardless of the charging of the capacitor 77.

The phase shifted signal which is applied to the base 91 of the transistor 92 to accomplish the inhibiting of the unijunction transistor 32 during approximately the first half of each unidirectional pulse may be said to be the first inhibiting signal. A second inhibiting signal is provided by connecting the output of the rectifier 17 from a circuit junction point 104 through a transistor 105 to a circuit junction point 106. A second voltage is applied to the junction point 106 through the use of a variable resistor or potentiometer 107 which is connected from the junction point 106 through a fixed resistance 108 to the circuit junction point 109 which is also the common line 27. A third signal is applied to the circuit junction pont 106, namely, the feedback signal from the junction point 52 is fed through a resistor 110 to the point 106. The summation of the currents which comprise the three signals applied to the point 106 determines the state of the transistor 92. In particular, the point 106 is connected through a diode 111 to the base 91 of the transistor 92. Since the feedback signal and the signal associated with the variable resistor 107 may be considered to be negative going currents conducting away from the junction point 106, and the input voltage signal conducting through the resistor 105 may be said to be a positive going current, the transistor 92 will conduct whenever the input signal at the output of the rectifier 17 exceeds the summation of the feedback signal and the signal conducting through the variable resistor 107. When the transistor 92 is conducting, an inhibiting signal will be generated as in the case of the inhibiting signal which was generated during the first half of each unidirectional pulse. When the effects of the two inhibiting signals are combined, it can be seen that the SCR assembly 13 will be conducting only for firing angles which are substantially greater than 90° and only under such circumstances during which the input circuit signal exceeds the feedback speed sensitive signal by a specified amount. This circumstance is illustrated in FIG. 4 where the phase shift signal 112 is shown to cause the firing of the SCR to be inhibited during the first 90°, that is, from the point 113 to the point 114. This is an approximation only, and the presence of the resistor 86 is made available to adjust the shift of the current waveform 112 in order to achieve the proper inhibiting action. Also, assuming the horizontal line 115 is representative of the magnitude of the armature feedback signal and the distance 116 is representative of the magnitude of the negative going signal applied through the variable resistor 107, it is apparent that the inhibiting signal, namely the conduction of the transistor 99 will occur from the point 113 to the point 114 and also from the point 114 to the point 117 during which time the signal 22 exceeds the sum of the magnitude of the feedback signal 115 and the reference signal 116. It is also apparent that since the magnitude of the signal 22 exceeds the magnitude of the signals 115 and 116 at the point 118, that conduction would occur on the rise of the signal 22 but for the inhibiting effect of the phase shift signal 112. Accordingly, the signal 112 limits the firing of the system to the fall time of the signal, and the feedback signal 115 as well as the reference signal 116 limits the firing angle to a time greater than $t_2$.

We claim:

1. A control system for supplying energy to a load comprising:
   power supply means,
   first switching means for connecting the power supply means to the load to develop a signal thereat, said switching means having a control terminal, a control supply source,
   second switching means for connecting said control supply source to said control terminal,
   means for gating said second switching means alternately into an on and off condition thereby periodically applying a control signal to said control terminal,
   means for inhibiting said gating means to hold said second switching means in an off condition,
   said second switching means comprising a unijunction transistor and said means for inhibiting said gating means comprising means for increasing the interbase voltage of said unijunction transistor beyond the firing capability of said gating means.

2. A control system in accordance with claim 1 wherein said means for gating said second switching means comprises:
   a capacitor for controlling the firing time of said unijunction transistor, and
   a Zener diode connected in parallel with said capacitor to limit the potential in said capacitor and hence the firing potential of said unijunction transistor.

3. A control system in accordance with claim 1 wherein said means for generating an inhibit signal comprises:
   reference signal means,
   means for comparing the signal at the load with said reference signal and for generating a triggering signal in response thereto,
   an inhibit supply source,
   third switching means for connecting the inhibit supply source to said second switching means, said third switching means having a control terminal,
   means for applying said triggering signal to the control terminal of said third switching means,
   said means for comparing the signal at the load with said reference signal comprising a transistor having base connections to the load signal and to the reference signal and having an output terminal connected to the input of said third switching means.

4. A control system for supplying energy to a load comprising:
   power supply means for generating a unidirectional pulse train,
   first switching means for connecting the power supply means to the load, and developing a signal thereat,
   a gating circuit having means for gating said first switching means into an on condition,
   an inhibit circuit for overriding said gating means to hold said first switching means in an off condition,
   said inhibit circuit comprising means for developing first and second successive inhibit signals and for applying said inhibit signals to said gating circuit, said first inhibit signal being applied to the gating circuit during the rise time of a pulse generated by said power supply means, and said second inhibit signal being applied to the gating circuit during the fall time of a pulse generated by said power supply means.

5. A control system in accordance with claim 4 wherein said gating circuit comprises a unijunction transistor and an associated timing capacitor and wherein said inhibit signals are signals which increase the interbase voltage of the unijunction transistor beyond the firing potential of said timing capacitor.

6. A control system in accordance with claim 4 wherein said means for developing said first inhibit signal comprises:

an inhibit supply source,
a second switching means for connecting the inhibit supply source to the gating circuit for overriding the gating means,
a reference signal means,
means for comparing the signal at the load with the reference signal and with the signal at the power supply means for generating a triggering signal in response thereto,
means for applying said triggering signal to the input of said second switching means,
said means for developing said second inhibit signal comprising means for generating a signal substantially shifted in phase with respect to the signal at said power supply means, and
means for adding said phase shifted signal to said triggering signal and for applying the instantaneous algebraic sum thereof to the input of said second switching means.

7. A control system for supplying energy to a load comprising:

power supply means for generating a rectified AC power signal,
means for switching said AC signal to the load,
means for gating said switching means on and off in accordance with said power signal,
means for inhibiting the operation of said gating means in response to a signal at the load,
said means for inhibiting the operation of said gating means comprising means for phase shifting a signal from the power supply by approximately 90°,
means for comparing the magnitude of the phase shifted signal, the power supply signal and a load signal and for generating a triggering signal in response thereto, a shunt switching means operatively disposed between the power supply and the gating means, and
means for applying the triggering signal to actuate the shunt switching means.

8. A load control circuit comprising:

supply means for generating a rectified AC energizing signal,
means for switching the supply means to the load during each pulse of the rectified AC signal, a first reference signal,
means for comparing the load signal to the reference signal and for generating thereby an error signal,
means for increasing the firing angle of the switching means in response to increases in the error signal,
means for inhibiting the firing of the switching means during rise time of each pulse of the rectified AC signal, and
means for inhibiting the firing of the switching means during a portion of the fall time of each pulse of the rectified AC signal.

9. A load control circuit in accordance with claim 8 wherein said means for inhibiting the firing of the switching means during a portion of the fall time of each pulse of the rectified AC signal comprises reference signal means, means for comparing the load signal to the reference signal and for generating an inhibit signal in response thereto, and means for applying the inhibit signal to the switching means when said reference signal exceeds the load signal by a specified quantity.

10. A load control circuit in accordance with claim 8 wherein said means for inhibiting the firing of the switching means during the rise time of each pulse of the rectified AC signal comprises:

an electronic switch having a control terminal and output switching terminals,
means for applying a signal substantially in phase with the rectified AC signal across the output switching terminals,
means for applying a phase lagging signal to the control terminal, and
means for applying a signal generated by the closing of the electronic switch to the switching means for inhibiting the firing thereof.

11. An SCR control circuit comprising:

an SCR having a gate,
means for applying a repetitive pulse signal through the SCR to a load,
a unijunction gating circuit,
means for applying the output of the unijunction gating circuit to the gate of the SCR,
means for developing a timing signal having a substantially identical phase relationship with the repetitive pulse signal and for applying the timing signal across the interbase terminals of the unijunction timing circuit,
means for adjusting the magnitude of the timing signal from values below firing potential to values above firing potential of the unijunction firing circuit in response to decreases in the load signal,
said means for adjusting the magnitude of the timing signal comprising a Zener diode in series with the unijunction gating circuit and a transistor connected across the diode to shunt the timing voltage to the gating circuit, and
means for applying a control signal to the transistor in response to decreases in the load signal.

References Cited

UNITED STATES PATENTS

| | | | |
|---|---|---|---|
| 3,127,550 | 3/1964 | Gilbreath et al. | 318—434 XR |
| 3,177,418 | 4/1965 | Meng | 318—434 XR |
| 3,286,151 | 11/1966 | Dinger | 318—331 |
| 3,373,331 | 3/1968 | Dow | 318—345 XR |

ORIS L. RADER, Primary Examiner

R. J. HICKEY, Assistant Examiner

U.S. Cl. X.R.

318—434